Feb. 15, 1955   W. E. O'SHEI   2,701,891
WINDSCREEN WIPER
Filed June 1, 1951   2 Sheets-Sheet 1
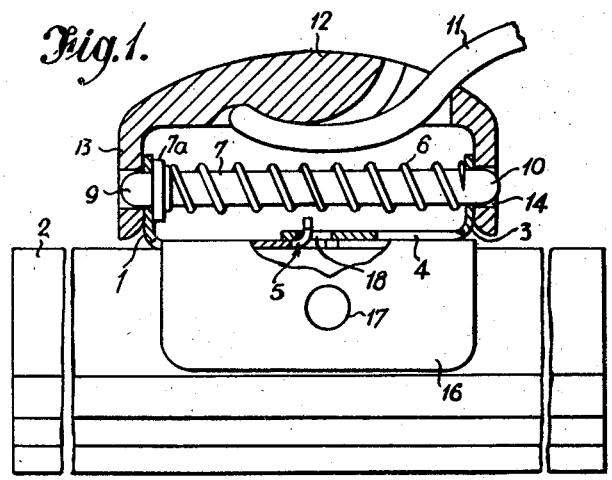
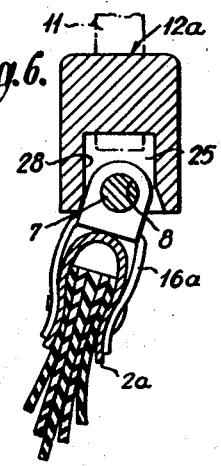
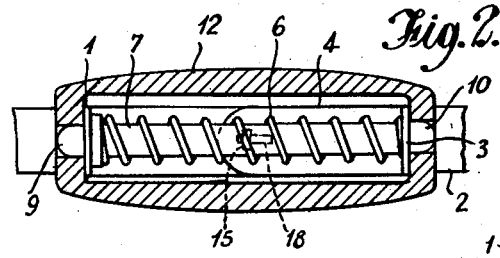
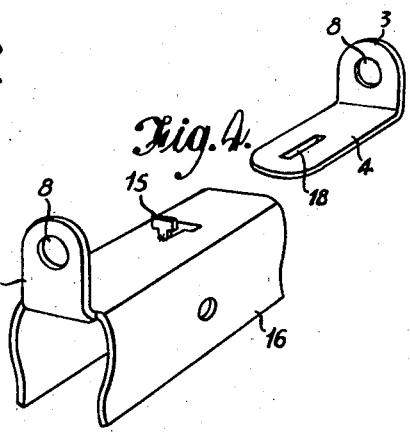
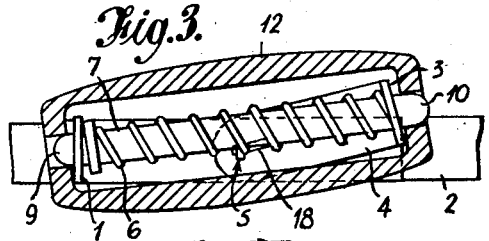
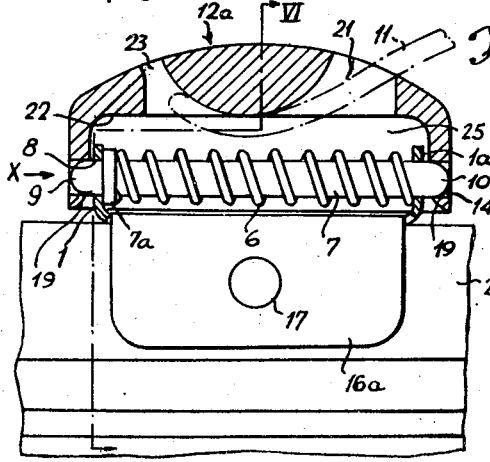
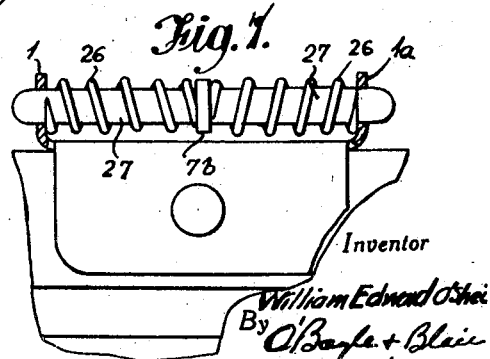
Inventor
William Edward O'Shei
By O'Boyle + Blair
Attorneys

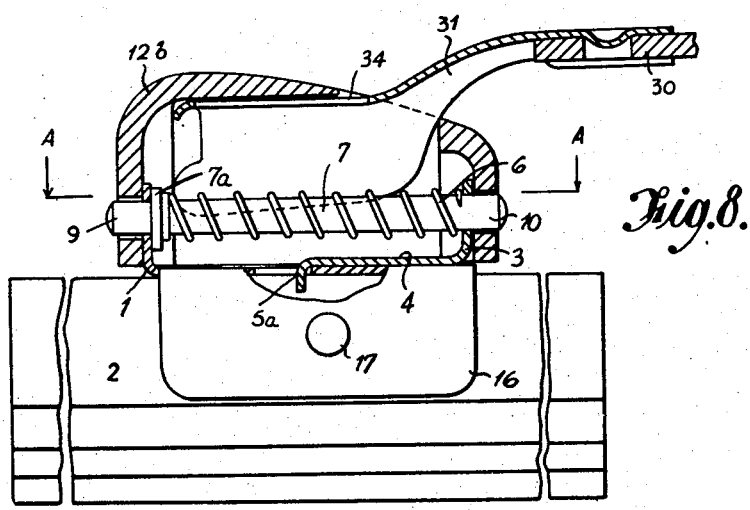
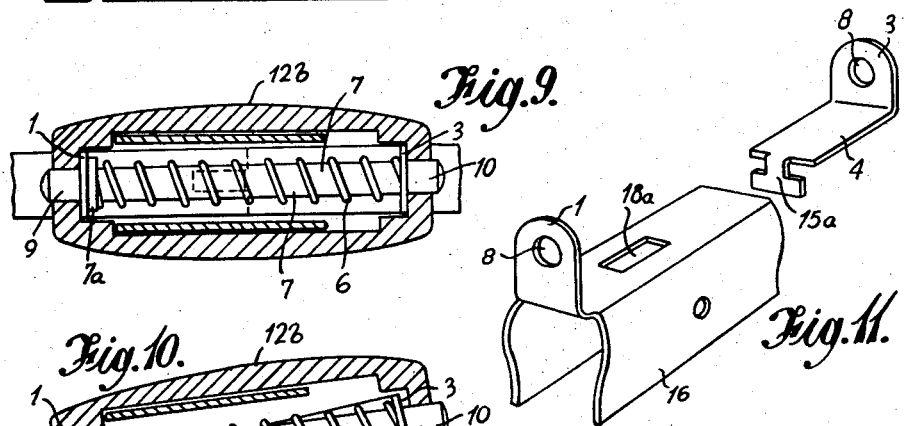
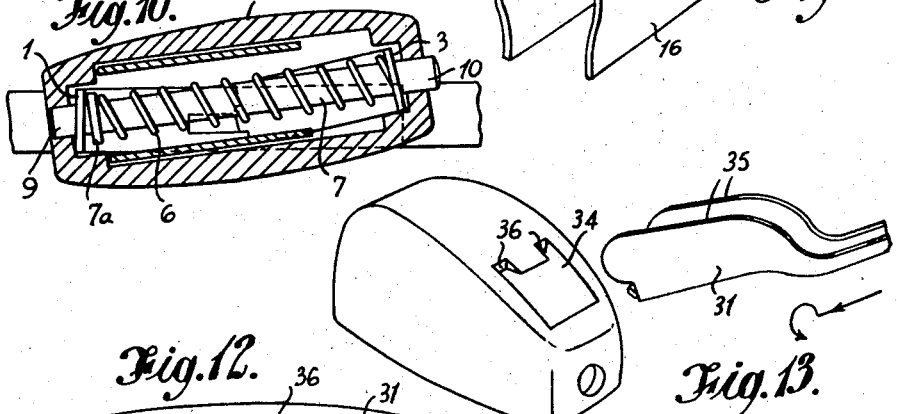
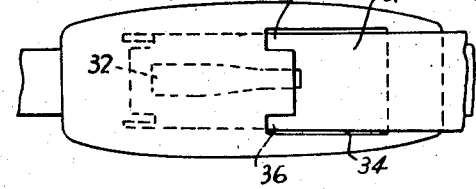
Inventor
William Edward O'Shei
By O'Boyle + Blair
Attorneys

# United States Patent Office 2,701,891
Patented Feb. 15, 1955

2,701,891

WINDSCREEN WIPER

William Edward O'Shei, London, England

Application June 1, 1951, Serial No. 229,307

13 Claims. (Cl. 15—250)

The present invention relates to windscreen wipers and windscreen wiper blades, and more particularly to an arrangement for connecting a windscreen wiper blade to a windscreen wiper arm.

From one aspect the invention consists in a connector for connecting a wiper blade to a wiper arm, comprising a pair of spaced members or ears each having apertures through which extends a pin, the ends of which project beyond the outer surfaces of the apertured members or ears, said pin being surrounded by or associated with one or more springs, preferably helical springs, which urges or urge the pin into a normal position with its ends projecting beyond both the apertured members or ears, at least one of said projecting ends being free to move inwardly longitudinally against the action of the spring or springs.

The fitting described is adapted to connect with a complementary fitting comprising apertured end walls into which the projecting ends of the pin are adapted to fit. The end walls may be constituted by the end walls of a recess formed in the under surface of a housing, said recess being of a size to fit over the supports or ears of the first fitting. Preferably the distance between the said end walls is approximately the same as or slightly greater than the distance between the outer surfaces of the supports or ears. The two parts are connected together by inserting one projecting end of the pin into an aperture in one end wall and then depressing the other end of the pin against the action of the spring or springs so that it can pass into the housing and be finally urged by the spring or springs into the aperture in the other end wall.

A number of embodiments of the invention are illustrated in the accompanying drawings.

Fig. 1 is a side elevation showing partly in section, a form of connector permitting twisting of the blade, with part of the wiper blade and arm.

Figs. 2 and 3 are plan views respectively showing the device in its normal position and in a deflected position.

Fig. 4 is an exploded perspective view showing the attachment of the movable ear.

Fig. 5 is a view similar to Fig. 1 of a modified form of connector.

Fig. 6 is an end elevation, in section on line VI—VI of Fig. 5, and

Fig. 7 is a side elevation partly in section, showing a modified form of the pin-carrying part.

Fig. 8 is a side elevation, partly in section of another modified construction.

Figs. 9 and 10 are sections along the line A—A in Fig. 8, showing respectively the device in its normal position and in a deflected position.

Fig. 11 is an exploded perspective view showing the detachment of the movable ear.

Fig. 12 is a plan view of Fig. 8.

Fig. 13 is an exploded perspective view showing how the arm and housing are fitted together.

Referring now first to Figs. 1 to 4, the connector comprises an apertured ear 1 extending upwardly from the back of the wiper blade 2, and a second apertured ear 3 spaced therefrom and forming one limb of an L-shaped member of which the other limb 4 extends towards the first ear and is pivotally connected at 5 to the wiper blade so that the second ear can swing transversely with respect to the back of the blade. A rod 7 extends between the ears, its ends passing through the apertures 8 in the ears. Adjacent the end 9 of the rod 7 is formed a collar 7a, which, when abutting the ear 1, locates the rod with its ends 9 and 10 projecting beyond the ears 1 and 3 respectively. A helical compression spring 6 surrounds the rod 7 and is held in position under compression between the collar 7a and the ear 3. The ends 9 and 10 of the rod 7 extending beyond the ears form pivots for a member forming or carried by the end of the wiper arm 11. Preferably the member carried by the end of the wiper arm comprises a hollow housing 12, conveniently made by die-casting, which fits over and encloses the ears 1 and 3, the end walls 13 of the housing being apertured at 14 to receive the projecting ends 9 and 10 of the rod 7.

With the construction described, the housing 12 may be twisted relative to the longitudinal directoin of the blade 2, by swinging it about the end 9 of the rod beyond the fixed ear 1 and thereby moving the movable ear 3 transversely with respect to the blade 2 as shown in Fig. 3. This transverse movement of the movable ear reduces the distance between the ears 1 and 3 and thus further compresses the spring 6, which tends to restore the housing 12 into its position in alignment with the blade 2 when the pressure which is exerted to twist the blade relative to the arm 11 is removed.

Preferably the movable ear 3 is pivotally connected to the blade 2 or fixed ear 1 by a slot or like connection which permits the spacing between the ears to automatically adjust itself to the distance between the inner surfaces of the end walls 13 of the housing 12. Conveniently the fixed ear 1 is formed integrally with a channel-shaped metal stamping 16 which is adapted to be fitted over and secured, as by a rivet 17, to the back of the wiper blade 2, such that the ear 1 extends upwardly from the back of the blade 2. In order to connect the second ear pivotally to the back of this channel, a pivot pin, formed by stamping up a T-shaped tongue 15 from the channel member 16, is arranged to engage with its neck a longitudinal slot 18 in the limb 4 of the movable ear 3. Alternatively the pivot pin may be formed for example by a rivet which passes through the back of the channel member and the slot in the limb of the L-shaped member constituting the movable ear. Thus the spring pressure urges the movable ear 3 into contact with the inner surface of the adjacent end wall of the housing 12 and also urges the other end wall of the housing into close contact with the outer surface of the fixed ear 1. This holds the two parts in close contact and prevents rattle. Furthermore, since the outer surfaces of the ears 1 and 3 and the inner surfaces of the end walls are conveniently made flat, the slotted connection permits the movable ear to move slightly towards the fixed ear when the housing is rocked about the fixed ear, which rocking, as can be readily seen in Fig. 3, takes place about an edge of the ear 1, and not about the centre thereof, thus producing a further reduction of the distance between the two ears 1 and 3 and consequently further compression of the spring 6.

As previously mentioned, the housing preferably comprises a hollow die-casting and may be provided with means for attaching it to the wiper arm. For example, if the arm 11 is provided with a curved end, the top wall of the housing 12 may be apertured to receive the curved end of the arm. The inner surface of the top wall may be shaped to conform with the curvature of the end of the arm.

With the construction described the housing may be twisted in either one direction or the other relative to the wiper blade, in each case producing increased compression of the spring 6 which tends to restore the housing and blade to their normal relative positions. If it be desired that the blade and arm should be angularly movable to only one side of the normal position, then a stop or other means may be provided for preventing relative movement in the opposite direction.

The described form of the invention may be variously modified. For example, if the housing and fixed ear are so related that the swinging of the housing about the ear reduces the distance between the ear and the other end wall of the housing, such as is the case when the ear and end wall are substantially flat so that they rock about a point displaced from the axis of the rod, then the movable ear may be dispensed with, in which case the compression spring would bear directly at one end of the fixed ear and at its other end on the inner surface of the remote end wall of the housing. Furthermore, instead of being slidably mounted as illustrated, the rod 7 may be held captive between the ears in any convenient manner, for example by one end thereof being secured in the aperture in one of the end walls of the housing.

Fig. 5 shows a different form of the invention, in which no provision is made for relative twisting of the wiper blade and arm. In this embodiment a channel-shaped metal stamping 16a adapted to fit over the blade backing 2 has two ears 1 and 1a extending from the back of the channel 16a in a direction away from the back of the wiper blade 2a. The channnel may again be attached or secured to the blade backing 2, for example by means of a rivet 17 passing through the metal channel 16a and the backing 2 of the wiper blade, or by springing the channel 16a over the blade backing 2 like a spring clip. Each of the upstanding ears 1 and 1a is provided with an aperture 8, and extending between these apertures is a pin 7 which is of slightly greater length than the distance between the outer surfaces of the ears 1 and 1a so that the ends 9 and 10 of the pin will project beyond each of the ears. Adjacent one of its ends, the pin 7 is formed with a collar 7a which bears against the internal surface of the adjacent ear 1 when the pin is in its normal position with its ends 9 and 10 projecting beyond both of the ears. Surrounding the pin and extending between the collar 7a and the ear 1a at the opposite end of the fitting is a helical compression spring 6, which is normally under compression so as to urge the collar 7a to abut against its adjacent ear 1. With the construction described the pin 7 can move longitudinally in one direction only, namely to the right of Fig. 5, when pressure is exerted upon the left-hand end of the pin 7. This action further compresses the spring 6, and the pin 7 is restored to its normal position when the pressure is released.

The complementary connector part preferably comprises a die-cast housing 12a having a rectangular cavity 25 in its under surface, the length and width of the cavity being such that the housing may fit over and enclose the two ears 1 and 1a of the first connector part. Each end wall of the cavity 25 has an aperture 14 in alignment with the apertures 8 in the ears. The two parts are secured together by inserting the projecting end 10 of the pin which is remote from the collar 7a, into the aperture 14 in the corresponding end wall of the housing 12a, and then moving the pin inwardly in the direction of the arrow x (Fig. 5) against the action of the spring 6, whereby the other ear 1 may be swung into the housing 12a until the depressed end of the pin comes into alignment with the aperture 14 in the corresponding end wall, when the spring restores the pin 7 to its normal position and the two connector parts are connected together.

The end walls of the housing may be formed with inclined leading-in portions 19 so that the depressible end 9 of the pin 7 may be moved by simply pushing the housing over that end after the other end 10 has been inserted in the aperture 14 in the opposite end wall of the housing.

The width of the recess 25 in the housing 12a is preferably such as to permit the blade to rock through a limited angle about the ends of the pin when the two connector parts are connected together, and thus allow the blade 2a to assume an inclined trailing position as it moves across the surface of the windscreen. As indicated in Fig. 6, the amount by which the blade rocks relative to the wiper arm and housing 12a may be limited by the ears 1 and 1a engaging with the internal surfaces 28 of the side walls of the housing.

The housing may be permanently or detachably secured to the end of the wiper arm. With the arrangements described, interchangeable housings may be mounted on the blade fitting for attachment to different types of wiper arms, for example to arms having curved ends as above described, for slotted arms adapted for attachment to a fin type connector, or for arms which are secured to the blade by means of a transverse screw or split pin. For example, for attachment to an arm with a curved end 11, the die-casting 12a may be provided with an aperture 21 in its back surface into which the end 11 of the arm may be fitted to lie within the hollow cavity within the die-casting. The inner surface of the top wall 22 of the die-casting 12a may be shaped to conform with the curvature of the end 11 of the wiper arm.

Wiper arms with curved ends are made with two different standard widths, and in order that the housing may be adapted for attachment to either width of arm, according to a further feature of the invention it is provided with different sized apertures 21, 23 at opposite ends of its back wall 22 conforming with the different widths of arm. The arm is then either inserted into the aperture 21 at one end of the housing or the other aperture 23, depending upon the width of the arm.

In another modified construction which is shown in Fig. 7, the pin 27 is provided with a central collar 7b at opposite sides of which are arranged two springs 26, the opposite ends of which bear respectively against the internal surfaces of the two ears 1 and 1a to hold the collar 7b centrally therebetween with the ends of the pin 27 projecting through the apertures in the ears 1 and 1a.

In the common form of blade and arm connection as shown in British specification No. 470,652, the blade is provided with a hook-shaped fin adapted to be engaged in the slot of a channel-shaped member secured to or formed at the end of the wiper arm. The blade usually requires replacement before the arm and a further object of the present invention is to provide an improved connector fitting on the blade which can be fitted to the channel-shaped end of existing wiper arms of the kind above-mentioned, the improved connector imparting a more modern appearance to the resultant arm and blade assembly and enabling the connector to incorporate modern constructional features resulting in an improved wiping action.

According to this feature of the invention, which will be described with reference to Figs. 8 to 13, the wiper blade is provided with a connector comprising a hollow housing detachably connected to the back of the blade, the back of the housing, that is the surface thereof remote from the back of the blade, being provided with an aperture from one end of which extend two slots of such width and spaced apart at such a distance that the said two slots can receive the two side walls of the channel-shaped member at the end of the wiper arm.

Referring to Figs. 8 to 13 of the drawing, the connector comprises an apertured ear 1 extending upwardly from the back of the wiper blade 2, and a second apertured ear 3 spaced therefrom and forming one limb of an L-shaped member of which the other limb 4 extends towards the first ear and is pivotally connected at 5a to the wiper blade so that the second ear 3 can swing transversely with respect to the back of the blade. Between the ears is arranged the rod 7 with a collar 7a for locating the rod with its ends 9, 10 projecting through apertures 8 in the ears, the rod being surrounded by a helical compression spring 6 which is held in position under compression between the collar 7a and the ear 3. The ends 9 and 10 of this rod extend beyond the ears and form pivots for the housing 12b, forming or carried by the end of the wiper arm 11. The housing 12b, conveniently made by die-casting, fits over and encloses the ears 1 and 3, the end walls 13 of the housing being apertured at 14 to receive the projecting ends 9 and 10 of the rod 7.

With the construction described, the housing 12b may be twisted relative to the longitudinal direction of the blade 2, by swinging it about the end 9 of the rod beyond the fixed ear 1 and thereby moving the movable ear 3 transversely with respect to the blade 2 as shown in Fig. 10. This transverse movement of the movable ear reduces the distance between the ears 1 and 3 and thus further compresses the spring 6, which tends to restore the housing 12b into its position in alignment with the blade 2 when the pressure which is exerted to twist the blade relative to the housing 12b is removed.

Preferably the movable ear 3 is pivotally connected to the blade 2 or fixed ear 1 by a slot or like connection which permits the spacing between the ears to automatically adjust itself to the distance between the inner surfaces of the end walls 13 of the housing 12. Conveniently the fixed ear 1 is formed integrally with a channel-shaped metal stamping 16 which is adapted to be fitted over and secured, as by a rivet 17, to the back of the wiper blade 2, such that the ear 1 extends upwardly from the back of the blade 2. In order to connect the second ear pivotally to the back of this channel, a pivot pin, formed by forming a T-shaped lug 15a at the end of the limb 4, is arranged to engage with its neck a longitudinal slot 18a in the back of the channel member 16. Thus the spring pressure urges the movable ear 3 into contact with the inner surface of the adjacent end wall of the housing 12 and also urges the other end wall of the housing into close contact with the outer surface of the fixed ear 1. This holds the two parts in close contact and prevents rattle. Furthermore, since the outer surfaces of the ears 1 and 3 and the inner surfaces of the end walls are conveniently made flat, the slotted connection permits the movable ear 3 to move slightly towards the fixed ear 1 when the housing is rocked about the fixed ear, which rocking, as can be readily seen in Fig. 10, takes place about an edge of the ear 1, and not about the centre thereof, thus producing a further reduction of the distance between the two ears 1 and 3 and consequently further compression of the spring 6.

The housing is adapted to be connected to the end of a conventional wiper arm 30 of the type which is provided with a channel-shaped member 31 at its end, normally intended to be connected to a blade provided with a thin metal hook-shaped fin adapted to be inserted through the slot 32 in the end 31. For connection to such a wiper arm the back of the connector 12b is provided with a rectangular aperture 34 of a width slightly greater than the width across the outside surfaces of the side walls 35 of the member 31. At one end of the aperture 34 are formed two slots 36 (see Figs. 12 and 13), of such a width that the side walls 35 can pass therethrough. The length of the aperture 34, excluding slots 36, is insufficient to allow the member 31 to pass therethrough.

To connect the arm to the housing, the arm is turned, as shown in Fig. 13, so that the side walls 35 extend in the same direction as the slots 36. When in this position the arm can be inserted through the aperture 34, and after it has passed through it is possible to rotate the arm through 180° by reason of the reduced cross-section of the metal strip member of the arm 30 connecting the end 31 to the arm head (not shown). When the arm has been turned round, it is pulled outwards until the end 31 lies within the housing 12b, the housing then being secured over the ends of the rod 7 to attach it to the wiper blade. The side walls 35 then lie at opposite sides of the spring 6 and prevent the arm 30 from being turned relative to the aperture 34. The arm is thus securely held in the housing.

With the connector described, improved control of the degree of rocking of the blade to its trailing position as it moves across the screen, is achieved. Additionally, the wiper blade may be twisted in either one direction or the other relative to the housing and arm in order to increase the arc of wiping. If it be desired that the blade should be angularly movable to only one side of its normal position, then a stop or other means may be provided for preventing relative movement in the opposite direction.

With the construction described the housing is revesible, and if the blade fitting is arranged off-centre of the length of the blade, the length by which the blade projects from the arm can be changed by reversing the housing on the blade fitting.

Whilst particular embodiments have been described, it will be understood that various modifications may be made without departing from the spirit of the invention. For example various features of the individual embodiments may be differently combined. Thus a further modification is arrived at by replacing the pin 7 and spring 6 in the embodiment described with reference to Figs. 1 to 4 by the pin 27 and springs 26 of the embodiment illustrated in Fig. 7.

I claim:

1. A windscreen wiper blade, comprising a squeegee element and a backing member carrying said squeegee element, a first wall member fast on said backing member to present a wall surface substantially perpendicular to the blade, a second wall member mounted on the backing member for pivotal movement laterally of the blade about an axis disposed between said two wall members, said second wall member presenting a surface normal to its radius of pivotal movement, pin elements projecting outwardly from said wall surface of each wall member, and a compression spring interposed between said wall members for urging said wall members apart for normally holding them in a position in which said surfaces of the two wall members are parallel.

2. A connector for connecting a wiper blade to the wiper arm of a windscreen wiper, comprising a pair of spaced ears each having an aperture, a pin extending through the apertures of both said ears with its two ends projecting beyond the outer surface of said ears respectively, said pin having a collar arranged adjacent the centre of the length of the pin, and two helical springs surrounding the pin and respectively interposed between the collar and each of the two spaced ears.

3. A windscreen wiper blade provided with means for detachably connecting it to a wiper arm, said means comprising a pair of spaced ears having apertures therein, a pin extending through the apertures and movable longitudinally therein, a collar on said pin which is so positioned that when it bears against the inner surface of one of said ears it locates the pin with its opposite ends projecting beyond the outer surfaces of the ears respectively, and a helical spring surrounding the pin and compressed between the collar and the remote ear, one of said ears forming one limb of a substantially L-shaped member, the other limb of which is pivotally connected to a member fixed to the other ear whereby said first ear may swing transversely with respect to the second ear.

4. A device as claimed in claim 3, comprising also a housing having a cavity defining end walls adapted to fit over the outer surfaces of the two ears, said end walls of the housing being provided with apertures adapted to fit over the projecting ends of the pin, said housing also having means for attaching it to a windscreen wiper arm.

5. A device as claimed in claim 4, wherein the housing is so dimensioned as to be capable of a limited rocking movement about the connector pin when the housing is mounted thereon.

6. A windscreen wiper arm and blade assembly comprising a wiper arm having a channel-shaped end portion, a wiper blade and a connector carried by the blade for assembling it to the wiper arm, said connector comprising a hollow housing detachably connected to the blade, said housing having a cavity which is open on the face of the housing which is adjacent the back of the blade when the housing is fitted thereto, said cavity being of a size to receive the channel-shaped end portion of the wiper arm but closely fitting said channel-shaped end to prevent turning thereof, when within the cavity, about the axis of the wiper arm, an aperture in the wall of the housing opposite to said open face, said aperture extending through said wall into the cavity, two slots extending from one end of said aperture in substantially parallel directions, the size and disposition of said aperture and said slots being such that the channel-shaped end portion of the wiper arm can pass therethrough when it is orientated so that the side walls of the channel-shaped end extend in the same direction as the slots but not when the channel-shaped end is orientated in the opposite direction, and said aperture being of a size enabling the wiper arm to be turned therein after the channel-shaped end has been inserted through the aperture and slots and moved beyond the open face of the cavity.

7. A windscreen wiper blade comprising a squeegee element and a backing member therefor, a pair of spaced ears extending upwardly from said backing member, each of said ears having an aperture, a pin extending through the apertures of both said ears and movable longitudinally therein, an abutment on said pin at a point spaced from both its ends and so positioned that when it bears against the inner surface of one of said ears it locates the pin with its opposite ends projecting beyond the outer surfaces of the ears respectively, a helical compression spring surrounding the pin and interposed between the other ear and said abutment, a housing having a cavity which is open on one face thereof, said cavity being of substantially rectangular shape, said housing being fitted over the ears with the end walls of the housing arranged outside the ears respectively, said end walls being provided with apertures which receive the projecting ends of the pin respectively, and means for attaching said housing to a windscreen wiper arm.

8. A windscreen wiper blade comprising a squeegee element and a backing member therefor, a first apertured ear extending upwardly from said backing member, a second apertured ear extending upwardly from the backing member and spaced from said first ear, said second ear forming one limb of an L-shaped member of which the other limb extends towards the first ear, means pivotally connecting said other limb to the backing member at a point intermediate said ears so that the second ear can swing transversely with respect to the backing member, a pin extending through the apertures in the ears with its ends projecting beyond the outer surfaces of the ears, and a helical compression spring located between the two ears and surrounding said pin.

9. A windscreen wiper blade as claimed in claim 8, in which the means pivotally connecting the L-shaped member to the backing member is constructed to allow the L-shaped member to move bodily against the action of the spring towards the first ear.

10. A windscreen wiper blade as claimed in claim 9, comprising also a housing member having means for connecting it to a wiper arm, said housing member having a cavity into which the ears extend, the projecting ends of the pin extending into apertures formed in the end walls of the cavity which lie outside the ears, twisting of the housing relative to the backing member causing the second ear to pivot with respect to the first ear and compress the spring positioned therebetween.

11. A windscreen wiper blade comprising a squeegee element and a backing member therefor, a first apertured ear extending upwardly from said backing member, a second apertured ear extending upwardly from the backing member and spaced from said first apertured ear, said second apertured ear forming one limb of an L-shaped member of which the other limb extends towards the first ear, means pivotally connecting said other limb to the backing member at a point intermediate said ears, said pivot permitting the second ear to swing transversely with respect to the backing member and also to move bodily towards said first ear, a pin extending through the apertures of both said ears and movable longitudinally therein, an abutment on said pin at a point spaced from both its ends and so positioned that when it bears against the inner surface of one of said ears it locates the pin with its opposite ends projecting beyond the outer surfaces of the ears respectively, a helical compression spring surrounding the pin and interposed between the other ear and said abutment, a housing having a cavity which is open on one face thereof, said cavity being of substantially rectangular shape, said housing being fitted over the ears with the end walls of the housing arranged outside the ears respectively, said end walls being provided with apertures which receive the projecting ends of the pin respectively, and means for attaching said housing to a windscreen wiper arm.

12. A windscreen wiper blade having a backing member provided with means for connecting it to a wiper arm, said means comprising a first ear upstanding from said backing member, a substantially L-shaped member one limb of which forms a second ear spaced from the first ear longitudinally of the blade, the other limb of the L-shaped member being pivoted to the backing member of the blade for limited movement towards and away from said first ear and for pivoted movement about a point intermediate said ears, apertures in each ear, a pin extending through both said apertures and having an abutment intermediate said ears, and at least one helical spring member interposed between said abutment and one of said ears and acting through said abutment onto the other ear to urge said ears apart and hold said pin in a predetermined position relative to said ears.

13. A windscreen wiper blade comprising a squeegee element and a backing member therefor, an ear carried by and extending upwardly from said backing member, one surface of said ear being substantially flat, and a housing member which is adapted to be connected to a wiper arm and is formed with a cavity of which the inner surface of one of the end walls is substantially flat, said ear extending into the cavity and having its substantially flat surface bearing against the substantially flat inner surface of said end wall, a helical compression spring positioned between the ear and the other end of the cavity and urging said flat surfaces together, and means connecting the housing and ear in a manner to permit the housing to rock transversely with respect to the backing member about either one or other of the side edges of the ear.

References Cited in the file of this patent

UNITED STATES PATENTS

| | | |
|---|---|---|
| 1,703,181 | Tarver | Feb. 26, 1929 |
| 2,025,888 | Olivero | Dec. 31, 1935 |
| 2,170,939 | Christen | Aug. 29, 1939 |
| 2,270,589 | Hansen | Jan. 20, 1942 |

FOREIGN PATENTS

| | | |
|---|---|---|
| 615,500 | Great Britain | Jan. 6, 1949 |